Patented Dec. 30, 1947

2,433,419

UNITED STATES PATENT OFFICE 2,433,419

METHOD OF CHLORINATING PARAFFIN

Paul Bosko, South River, N. J., assignor to Hercules Powder Company, Wilmington, Del., a corporation of Delaware No Drawing. Application October 21, 1944, Serial No. 559,829

6 Claims. (Cl. 260—660)

1

This invention relates to chlorinated paraffin wax and more particularly to a process of preparing an improved chlorinated paraffin wax having a uniform light color and increased stability to decomposition by heat.

The substitution chlorination of paraffin wax is well known in the art, the reaction usually having been carried out by passing gaseous chlorine through molten paraffin wax until the product contained the desired amount of chlorine. The conditions of time, temperature, pressure, and catalysis necessary to produce any particular type of chlorinated paraffin wax have been well established.

However, hydrogen chloride is formed as a by-product in the chlorination of paraffin wax, and it is essential that this acid-producing substance be removed from the chlorinated product, since the latter is used in many applications wherein even slight acidity cannot be tolerated. Due to its own volatility, particularly at the reaction temperatures generally used, the greater part of the hydrogen chloride escapes from the reaction mass, but substantial amounts of it and excess chlorine, which also is an acid-producing substance, remain entrapped in the chlorinated paraffin wax upon completion of the reaction. Various means have been suggested in the art for removing the hydrogen chloride, but none of these has proved satisfactory from a commercial standpoint.

Now in accordance with this invention, it has been found that, in the process of chlorinating a paraffin wax by passing gaseous chlorine into the molten paraffin wax until the desired chlorine content has been introduced, substantial removal of residual hydrogen chloride and excess chlorine may be effected by the combination of steps comprising lowering the temperature of the liquid chlorinated mixture until no substantial decomposition occurs, simultaneously maintaining the introduction of chlorine, although at a reduced rate, then discontinuing the introduction of chlorine and blowing air through the liquid chlorinated mixture at said lowered temperature. In accordance with this invention the above steps are essential to the production of a light colored chlorinated paraffin wax essentially free of hydrogen chloride and chlorine.

It has been found that discoloration of chlorinated paraffin wax occurs if the chlorine input is discontinued after the desired chlorine content has been introduced and the temperature is allowed to remain substantially that obtaining at the termination of the chlorination reaction, the discoloration taking place whether the removal of hydrogen chloride and excess chlorine is carried out or not. Furthermore, the means of removing the hydrogen chloride and chlorine is not a factor in causing the discoloration, for the latter results when either mechanical agitation alone or air blowing is used. It also has been found that cooling the chlorinated product is not sufficient means in itself to prevent a darkening in color.

It has been discovered unexpectedly, however, that no discoloration will occur if the chlorinated paraffin wax is cooled to a temperature which is lower than the reaction temperature and at which point no substantial decomposition occurs, meanwhile maintaining a continuous input of chlorine. In addition, it has been found that the removal of the residual hydrogen chloride and excess chlorine then can be effected after the cooling process without causing the color of the product to darken and that the product will retain its light color if the hydrogen chloride content has been substantially removed.

Now, having generally indicated the nature and purpose of this invention, the following example will constitute a specific illustration.

Example

A jacketed vessel suitable for use in chlorination was provided with an agitator, a chlorine inlet line entering the bottom of the vessel, and a discharge line at the top for removal of hydrogen chloride. The vessel was charged with 100 parts by weight of paraffin wax having a melting point of 48° to 51° C. The charge was heated to 70° C. by passing hot water through the jacket of the reaction vessel, then gaseous chlorine was introduced at a rate of approximately 3 parts by weight an hour. Thirty minutes after the initial introduction of chlorine the chlorine feed rate was increased to approximately 5 parts an hour, and at the end of another 30 minutes to 8.8 parts an hour. The latter rate was maintained until the chlorinated paraffin wax reached a chlorine content of 42 to 43 per cent. During the chlorination reaction, which was exothermic, the temperature was allowed to rise to 100° to 110° C., then maintained in this range by passing cold water through the jacket of the reaction vessel. After the product had reached a chlorine content of 42 to 43 per cent, the chlorine feed rate was reduced to 0.5 to 1.0 part by weight an hour, and the charge was cooled at 85° C., at which point the chlorine feed was discontinued. Maintaining the temperature at 85° C., compressed air then was blown through the product for 90 minutes until the acidity of the product was 65 parts per million, determined as hydrochloric acid. Air blowing then was discontinued, but the product was cooled further to a temperature of 70° C., after which it was discharged from the reaction vessel.

Although a paraffin wax having a melting point of 48° to 51° C. has been shown in the example, any paraffin wax having a melting point of about 20° to about 80° C. may be utilized. Those melting at about 45° to about 60° C. are preferred. The paraffin waxes may be those obtained from natural sources or those produced by synthetic means. For example, suitable paraffin waxes are available through treatment of ozokerite, a mineral wax, with sulfuric acid followed by subsequent bleaching, or from cracked oils and the oily distillates of natural bituminous substances, such as coal, shale, lignite, peat, wood, and natural petroleum, by refrigeration and centrifugation. More specifically, a paraffin wax having a melting point of about 45° to about 60° C. may be produced commercially by chilling light lubricant fractions of petroleum, the product consisting largely of a mixture of normal hydrocarbons of about 23 to about 28 carbon atoms per molecule, although branched-chain compounds undoubtedly are also present.

In order to liquefy the paraffin waxes specified by this invention and thereby facilitate passage of gaseous chlorine through them and promote the rate of chlorination, the waxes should be heated at least to their melting points, although it also may be desirable to heat them initially to a temperature of at least about 100° C., since the chlorination preferably is carried out at this or a higher temperature.

The actual chlorination is carried out by passing gaseous chlorine through the now molten mass of paraffin wax. Agitation of the latter is maintained during the chlorination, and the hydrogen chloride formed as a by-product is allowed to escape as completely as possible by reason of its own volatility, be absorbed in water, and recovered as hydrochloric acid.

During chlorination, the chlorine feed rate is adjusted to permit maximum reaction but prevent the passage of excess chlorine from the vessel. In the case of a paraffin wax having a melting point range of about 45° to about 60° C., for instance, an initial rate of about 3 parts by weight of chlorine per hour per 100 parts by weight of paraffin wax may be conveniently used, and this rate may be increased stepwise during the first hour until a value of about 8.8 parts per hour is reached. At this point the rate may be maintained substantially constant.

Since this type of chlorination reaction generally is exothermic, the temperature will rise due to the heat of reaction alone, and this effect may be permitted until a suitable reaction temperature is attained. A reaction temperature of at least about 100° C. is preferred. In case the paraffin wax initially is heated, prior to chlorination, to a temperature of at least about 100° C. it may or may not be desirable to allow the heat liberated during the chlorination to elevate the temperature, depending upon whether or not a suitable reaction temperature has been reached. After the desired reaction temperature has been reached, it is maintained during the remainder of the reaction by passing cold water through the jacket of the vessel, or by other suitable means.

The paraffin wax may be chlorinated to any desired chlorine content up to about 60%, although a range of about 10% to about 60% generally is more desirable and a range of about 35% to about 45% is preferable.

When the product has attained the desired chlorine content, the rate of chlorine input may be reduced to a point at which no substantial substitution chlorination takes place. The input, however, should be sufficient to maintain a positive chlorine pressure, and this generally may be accomplished by reducing the chlorine input to about 0.05 to about 0.20 the maximum value obtaining during the principal chlorination reaction. As an illustration, the example showed a reduction from 8.8 parts by weight of chlorine per hour per 100 parts by weight of paraffin wax to 0.5 to 1.0 part per hour.

Likewise, at the end of the main chlorination reaction control of the temperature should be initiated. This is a cooling process carried out in conjunction with reduction of the chlorine input and is accomplished by passing cold water through the jacket of the reaction vessel or by any other convenient method. To prevent decomposition of the chlorinated paraffin wax the temperature of the product should be lowered to a point substantially below the final reaction temperature. In the case of chlorinations carried out at a temperature of at least about 100° C. the liquid chlorinated product should be cooled to at least about 85° C. Cooling to temperatures in the range of about 85° to about 60° C. may be used conveniently, it being obvious that in any case the chlorinated mixture must be sufficiently liquid and mobile at the lower temperatures to permit the passage of air through the mass during the subsequent air blowing step. When the proper temperature has been reached, the chlorine input is discontinued, and compressed air, which is admitted through the chlorine inlet, is blown through the liquid product, substantially maintaining the lowered temperature. Instead of air, a gas such as nitrogen or carbon dioxide may be utilized.

The air blowing operation should remove substantially all of the residual hydrogen chloride and excess chlorine, and this generally may be accomplished by blowing for about 90 to about 120 minutes. The acidity of the product, determined as hydrochloric acid, should be reduced to at least about 100 parts per million, and a reduction to about 40 parts per million or lower is desirable, although a reduction to about 65 parts per million is satisfactory. The acidity may be determined by dissolving a sample of the chlorinated paraffin wax in a gasoline-type solvent, washing the resulting solution with water, and titrating the aqueous solution of hydrogen chloride so obtained to a phenolphthalein end point.

After the removal of hydrogen chloride and chlorine has been accomplished, the air blowing is discontinued, but the product may be cooled further, providing this is feasible, prior to discharging it from the reaction vessel. A cooling of from about 10° to about 20° C. below the temperature obtaining during the air blowing thus may be effected.

The chlorinated paraffin wax produced in accordance with this invention desirably has a chlorine content from about 10% to about 60% and preferably from about 35% to about 45%. The color index of the product is equal to about 1 to about 4 on the Gardner color scale (H. A. Gardner, "Physical and Chemical Examination of Paints, Varnishes, Lacquers, and Colors," ninth edition, Washington Institute of Paint and Varnish Research, 1939). This color index is descriptive of a product having a pale straw color. In contrast, the chlorinated paraffin waxes produced by prior art processes involving the removal of hydrogen chloride by air blowing have been characterized by a Gardner color index equal to about 14 or higher, which denotes a dark amber to brown color.

Chlorinated paraffin waxes are used mainly in impregnating compositions as flameproofing, waterproofing, and mildew-resisting ingredients. The impregnating formulations in turn may be utilized to treat materials in which resistance to fire, water, and mildew is a desirable quality. Examples of the type of materials concerned are: textile fabrics, such as are used in tents, tarpaulins, awnings, and loosely woven fabrics for camouflage purposes, linoleum, paints, and plastics.

The chlorinated paraffin wax of this invention is advantageous because it is light in color. The process for producing such chlorinated paraffin waxes is therefore superior to previous methods, since a uniformly light colored product is more desirable from the standpoint of its incorporation into various compositions, such as those used in flameproofing. The colors of flameproofing compositions are usually specified, consequently variations in the color of the chlorinated paraffin wax, which generally constitutes an appreciable portion of the composition, necessitate considerable alteration of the proportions of pigments from batch to batch. It is obvious that a chlorinated paraffin wax which is uniformly light in color would eliminate the need of color matching in the manufacture of impregnating compounds and that this necessarily would result in a great saving of time and expense. A light-colored chlorinated paraffin wax also is more advantageous because it is less subject to decomposition and liberation of hydrogen chloride upon exposure to heat and consequently is more likely to maintain its desirable light color.

What I claim and desire to protect by Letters Patent is:

1. A process for the preparation of chlorinated paraffin wax of low color which comprises passing gaseous chlorine into molten paraffin wax, the temperature of the paraffin wax being chlorinated being permitted to rise above 100 C., until the desired chlorine content of between about 10% and about 60% is achieved in the resulting product, the temperature being above 100° C. at this point, lowering the temperature of the chlorinated paraffin from above 100° C. to a temperature at which there is no substantial decomposition while simultaneously continuing introduction of chlorine although at a rate less than the maximum used in previous chlorination, discontinuing addition of chlorine upon reaching the said lower temperature, and blowing air through the product at such lowered temperature until residual free chlorine and hydrogen chloride are substantially removed.

2. A process for the preparation of chlorinated paraffin wax of low color which comprises passing gaseous chlorine into molten paraffin wax, the temperature of the paraffin wax being chlorinated being permitted to rise above 100° C., until the desired chlorine content of between about 10% and about 60% is achieved in the resulting product, the temperature being above 100° C. at this point, cooling the chlorinated paraffin to a temperature between about 60° C. and about 85° C. while simultaneously continuing introduction of chlorine although at a rate less than the maximum used in previous chlorination, discontinuing addition of chlorine, and blowing air through the product at such lowered temperature until the hydrogen chloride content of the product is reduced to less than 100 parts per million.

3. A process for the preparation of chlorinated paraffin wax low in color which comprises melting paraffin wax having a melting point of about 48° C. to about 51° C., passing gaseous chlorine into the molten paraffin wax while permitting the temperature to rise to the range from about 100° C. to about 110° C., continuing chlorination within the said temperature range at a rate of about 3 to about 8.8 parts by weight of chlorine per 100 parts by weight of the paraffin wax until a chlorine content of about 42% to about 43% is reached in the product, cooling the chlorinated paraffin to a temperature below about 85° C. while maintaining the introduction of chlorine although at a rate of about 0.05 to about 0.20 the maximum rate utilized in the chlorination, discontinuing the introduction of chlorine, and blowing air through the chlorinated product at such lowered temperature until the hydrogen chloride content of the product is reduced to below 65 parts per million.

4. In the process of removing residual free chlorine and hydrogen chloride from paraffin wax chlorinated in the molten state and at a chlorination temperature above 100° C. to form a product of 10–60% chlorine content, the improvement in stabilization and purification, resulting in a stable product low in color, which consists in cooling the chlorinated paraffin from above 100° C. to a temperature at which there is no substantial decomposition while simultaneously continuing introduction of chlorine although at a rate less than previously used for chlorination, discontinuing addition of chlorine, and blowing air through the product at such lowered temperature until the residual free chlorine and hydrogen are substantially removed.

5. In the process of removing residual free chlorine and hydrogen chloride from paraffin wax chlorinated in the molten state to form a product of 10–60% chlorine content, and in which the chlorination temperature is above 100° C. as the desired chlorine content is approached, the improvement in stabilization and purification, resulting in a stable product low in color, which consists in cooling the chlorinated paraffin from above 100° C. to a temperature no higher than about 85° C. (at which temperature there is no substantial decomposition) while simultaneously continuing introduction of chlorine although at a rate less than previously used for chlorination, discontinuing addition of chlorine, and blowing air through the product at such lowered temperature until residual free chlorine and hydrogen chloride are substantially removed.

6. In the process of removing residual free chlorine and hydrogen chloride from paraffin wax chlorinated in the molten state at a temperature of from about 100° C. to about 110° C. until a product of the desired chlorine content is reached, the improvement in stabilization and purification whereby a product low in color is obtained, which consists in cooling the chlorinated paraffin from above 100° C. to a temperature between about 60° C. and about 85° C. while simultaneously continuing introduction of chlorine although at a rate of about 0.05 to about 0.20 the maximum rate utilized in the chlorination, discontinuing addition of chlorine, and blowing air through the product at the resulting lowered temperature until the hydrogen chloride content of the product has been reduced to less than about 100 parts per million.

PAUL BOSKO.

REFERENCES CITED

The following references are of record in the file of this patent:

UNITED STATES PATENTS

| Number | Name | Date |
| --- | --- | --- |
| 1,953,286 | Barth | Apr. 3, 1934 |
| 2,214,877 | Clark | Sept. 17, 1940 |

FOREIGN PATENTS

| Number | Country | Date |
| --- | --- | --- |
| 442,829 | Germany | Apr. 8, 1927 |

Certificate of Correction

Patent No. 2,433,419.                                    December 30, 1947.

PAUL BOSKO

It is hereby certified that errors appear in the printed specification of the above numbered patent requiring correction as follows: Column 5, line 51, for "100 C." read *100° C.*; column 6, line 45, insert the word *chloride* after "hydrogen"; and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.* though at a rate of about 0.05 to about 0.20 the maximum rate utilized in the chlorination, discontinuing addition of chlorine, and blowing air through the product at the resulting lowered temperature until the hydrogen chloride content of the product has been reduced to less than about 100 parts per million.

PAUL BOSKO.

REFERENCES CITED

The following references are of record in the file of this patent:

UNITED STATES PATENTS

| Number | Name | Date |
| --- | --- | --- |
| 1,953,286 | Barth | Apr. 3, 1934 |
| 2,214,877 | Clark | Sept. 17, 1940 |

FOREIGN PATENTS

| Number | Country | Date |
| --- | --- | --- |
| 442,829 | Germany | Apr. 8, 1927 |

Certificate of Correction

Patent No. 2,433,419.  December 30, 1947.

PAUL BOSKO

It is hereby certified that errors appear in the printed specification of the above numbered patent requiring correction as follows: Column 5, line 51, for "100 C." read *100° C.*; column 6, line 45, insert the word *chloride* after "hydrogen"; and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.*